US011483726B2

(12) United States Patent
Khawand et al.

(10) Patent No.: US 11,483,726 B2
(45) Date of Patent: Oct. 25, 2022

(54) COEXISTENCE MANAGEMENT IN DEVICE COMMUNICATIONS

(71) Applicant: Microsoft Technology Licensing, LLC, Redmond, WA (US)

(72) Inventors: Charbel Khawand, Sammamish, WA (US); Sean Russell Mercer, Issaquah, WA (US); Guy Bernard Major, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 16/779,915

(22) Filed: Feb. 3, 2020

(65) Prior Publication Data

US 2021/0044990 A1 Feb. 11, 2021

Related U.S. Application Data

(60) Provisional application No. 62/883,479, filed on Aug. 6, 2019.

(51) Int. Cl.
| | |
|---|---|
| *H04W 24/08* | (2009.01) |
| *H04B 7/0413* | (2017.01) |
| *H04B 17/318* | (2015.01) |
| *H04W 4/80* | (2018.01) |

(52) U.S. Cl.
CPC .......... *H04W 24/08* (2013.01); *H04B 7/0413* (2013.01); *H04B 17/318* (2015.01); *H04W 4/80* (2018.02)

(58) Field of Classification Search
CPC ... H04W 24/08; H04W 4/80; H04W 72/1215; H04W 88/06; H04W 72/12; H04W 52/04; H04B 7/0413; H04B 17/318; H04B 7/0689
See application file for complete search history.

(56) References Cited

U.S. PATENT DOCUMENTS

| | | | | |
|---|---|---|---|---|
| 8,284,721 | B2* | 10/2012 | Chen | H04B 1/406 370/329 |
| 8,340,578 | B2* | 12/2012 | Tolentino | H04W 4/80 455/41.2 |
| 8,599,709 | B2* | 12/2013 | Chen | H04W 28/18 370/252 |
| 9,130,605 | B2* | 9/2015 | Hsu | H04B 1/006 |
| 9,155,103 | B2* | 10/2015 | Wietfeldt | H04W 72/1215 |
| 9,648,518 | B2* | 5/2017 | Chen | H04W 72/1215 |
| 2011/0111708 | A1* | 5/2011 | Tu | H04W 52/028 455/82 |
| 2013/0035047 | A1* | 2/2013 | Chen | H04B 1/406 455/79 |

(Continued)

OTHER PUBLICATIONS

"A Simple Antenna Bandwidth Augmentation Technique for Wireless Devices"; DeJean et al.; 2010 IEEE Antennas and Propagation Society International Symposium; Jul. 11-17, 2010 (Year: 2010).*

(Continued)

*Primary Examiner* — Benjamin H Elliott, IV
(74) *Attorney, Agent, or Firm* — Holzer Patel Drennan

(57) ABSTRACT

The technology disclosed herein includes an apparatus including an antenna, a plurality of wireless endpoints using the antenna, and a co-ex manager configured to measure an activity level of a wireless endpoint over a predetermined time period, compare the measured activity level of the wireless endpoint with a threshold activity level, and in response to the comparison, change an antenna operating mode of the wireless endpoint.

20 Claims, 6 Drawing Sheets

(56) References Cited

U.S. PATENT DOCUMENTS

| | | | | |
|---|---|---|---|---|
| 2013/0309982 | A1* | 11/2013 | Yan | H04W 72/085 |
| | | | | 455/79 |
| 2013/0336242 | A1* | 12/2013 | Rajagopal | H04L 5/00 |
| | | | | 370/329 |
| 2014/0281235 | A1* | 9/2014 | Liu | G06F 11/3409 |
| | | | | 711/118 |
| 2014/0313910 | A1* | 10/2014 | Appleton | H04L 1/20 |
| | | | | 370/252 |
| 2017/0001649 | A1* | 1/2017 | Dickow | H04L 67/12 |
| 2017/0180933 | A1* | 6/2017 | Steiner | H04W 4/023 |
| 2017/0290038 | A1* | 10/2017 | Dickey | H04W 72/1215 |
| 2017/0303076 | A1* | 10/2017 | Song | H04L 1/1607 |
| 2017/0359113 | A1* | 12/2017 | Lee | H04B 7/0417 |
| 2018/0092109 | A1* | 3/2018 | Belghoul | H04W 72/1215 |
| 2018/0248811 | A1* | 8/2018 | Di Nallo | H04L 47/564 |
| 2018/0359624 | A1* | 12/2018 | Polo | H04W 4/80 |
| 2019/0007115 | A1* | 1/2019 | Luong | H04B 7/0626 |
| 2020/0106496 | A1* | 4/2020 | Kagitapu | H04W 88/02 |
| 2020/0294401 | A1* | 9/2020 | Kerecsen | G05D 1/0287 |
| 2021/0044990 | A1* | 2/2021 | Khawand | H04W 4/80 |

OTHER PUBLICATIONS

"International Search Report and Written Opinion Issued in PCT Application No. PCT/US20/036875", dated Sep. 16, 2020, 13 Pages.

Malae, Vineela, "NFC Antennas for Smart Phones", In International Journal of Science, Engineering and Technology Research, vol. 6, Issue 10, Oct. 2017, pp. 1397-1403.

* cited by examiner

600

| Table I | |
|---|---|
| Flag | Description |
| BLE5GCoExMask | This flag holds a mask that determines how BLE and 5G Coexist together.<br><br>//This option allows simultaneous BLE and 5G operations only<br>FullShare = 0x1<br><br>//This option forces all 5G WLAN operations to stay in a 1X2<br>StaticCoEx = 0x2<br><br>//This option is a hybrid 5G and BLE mode<br>HybridMode = 0x4 |
| HybridModeMask | This flag is used when HybridMode is set to determine the type of co-existence to be applied.<br><br>//This option chooses a threshold based BLE control<br>ThresholdTrigger = 0x1<br><br>//This option selects a power based BLE control<br>PwrAvgTrigger = 0x2<br><br>//This option allows both Threshold and Power based BLC control<br>ComboTrigger = 0x4 |
| BLEAvgWnd | This value determines the running average window used by the FW to calculate the BLE threshold in HybridMode. It is a multiple of 625μsec represented as N*625 where N has a range of 0x0000 to 0xFFFF. |
| HybridModeTable | //This table is used by the FW when HybridMode option is set.<br><br>| PL (Power Level) | WiFi Chain 0 Power | BLE Threshold |<br>|---|---|---|<br>| 9 | PwrLvl9 | Threshold9 |<br>| 8 | PwrLvl8 | Threshold8 |<br>| 7 | PwrLvl7 | Threshold7 |<br>| 6 | PwrLvl6 | Threshold6 |<br>| 5 | PwrLvl5 | Threshold5 |<br>| 4 | PwrLvl4 | Threshold4 |<br>| 3 | PwrLvl3 | Threshold3 |<br>| 2 | PwrLvl2 | Threshold2 |<br>| 1 | PwrLvl1 | Threshold1 |<br>| 0 | PwrLvl0 | Threshold0 | |
| BLEThresholdHysteresis | A time value equal to [(M*7.5ms) + α] used when HybridMode is set. It represents a hysteresis window before a transition between 1x2 and 2x2 can take place.<br><br>M is an integer value between 0-1024.<br><br>α is a pseudo-random value between 0 – 30ms. |

FIG. 6

COEXISTENCE MANAGEMENT IN DEVICE COMMUNICATIONS

CROSS-REFERENCE TO RELATED APPLICATIONS

This application is a non-provisional application of and claims benefit of U.S. Provisional Application Ser. No. 62/883,479 entitled "Coexistence Management in Device Communications" and filed on Aug. 6, 2019, which is incorporated herein by reference in its entirety.

BACKGROUND

Telecommunication functionalities provided by devices, including mobile devices, is ever increasing. For example, mobile devices such as telephones were initially configured to simply operate as a telephone. Functionality was then added to include processors capable of executing applications on the device itself, maintain calendars, provide a variety of different messaging techniques (e.g., email, SMS, MMS, instant messaging), and so on. Consequently, mobile devices may be configured to support a variety of different communication techniques over different frequency ranges, such as a telephone network to engage in a wide area network wireless connection as well as local area network wireless connection. Traditional techniques that were utilized to support this wireless communication, however, relied on separate antennas that were specifically tuned to support a particular technique.

SUMMARY

The technology disclosed herein includes an apparatus including an antenna, a plurality of wireless endpoints using the antenna, and a co-ex manager configured to measure an activity level of a wireless endpoint over a predetermined time period, compare the measured activity level of the wireless endpoint of the wireless endpoint with a threshold activity level, and in response to the comparison, change an antenna operating mode of the wireless endpoint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 6 illustrates Table Ian example of a scheme for BLE co-existence with WiFi.

DETAILED DESCRIPTIONS

Technology disclosed herein provides a system for sharing antenna across multiple wireless endpoints. For example, such system may be implemented in a mobile device such as a mobile phone, a tablet device a laptop, in a computing device such as a desktop computer, or in other devices carrying Internet of things (IoT) technology. The wireless endpoints may be various wireless endpoints that may use an antenna resource such as a cellular modem, a Bluetooth endpoint, a 5G endpoint, etc.

The system for sharing antenna across multiple wireless endpoints may include an application processor with a co-existence manager (referred to as the "co-ex manager") that reads calculates various values power and activity levels for one or more of the multiple wireless endpoints, compares the calculated power and activity levels values with various co-ex register values, and determines the antenna resource operation mode based on the results of the comparisons.

Figure 1:
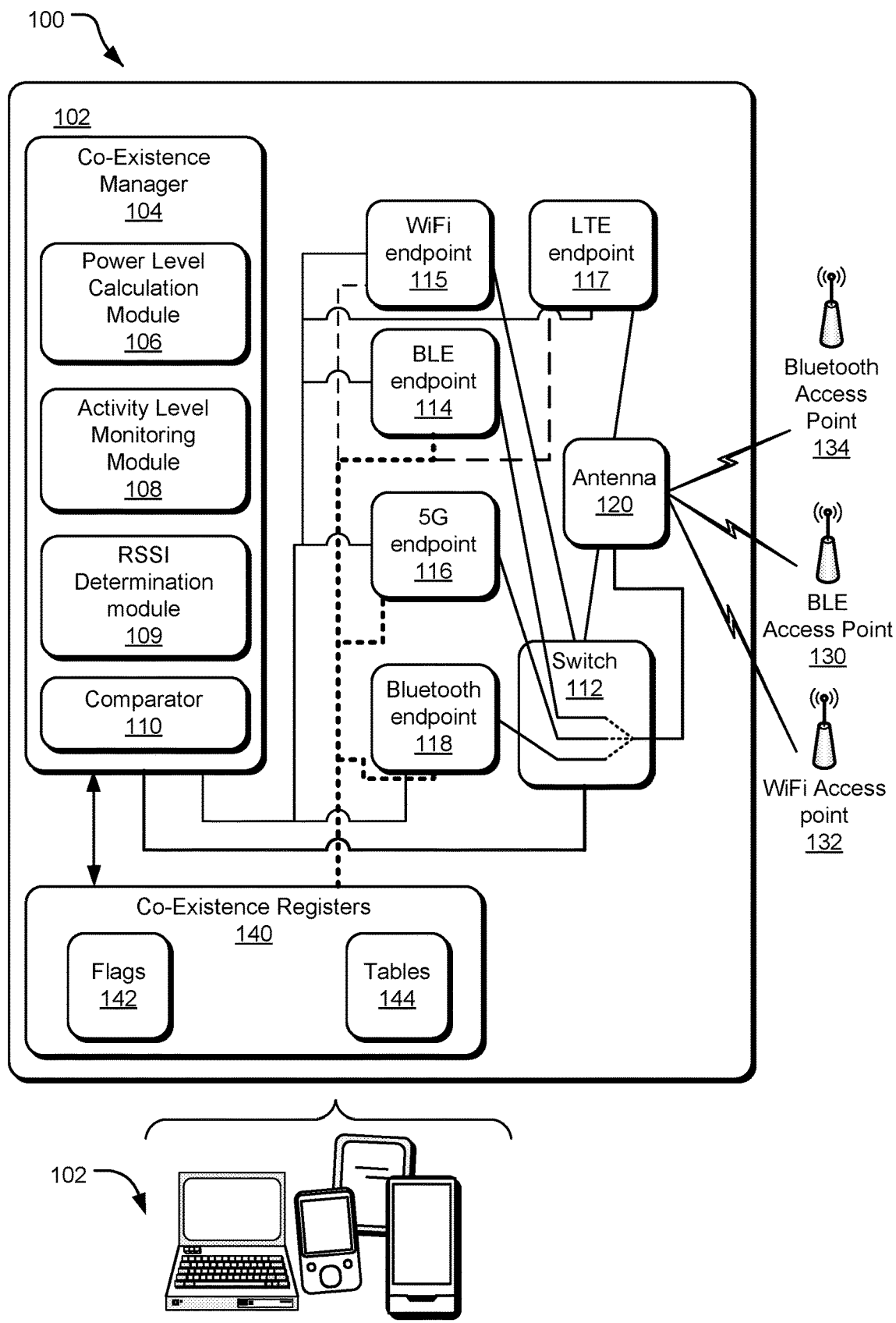
FIG. 1 is an illustration of an example block diagram of a system for sharing an antenna across multiple endpoints according to implementations disclosed herein.

FIG. 1 is an illustration of an example block diagram of an antenna sharing system 100 for sharing an antenna 120 across multiple endpoints according to implementations disclosed herein. The antenna sharing system 100 may be implemented on a device 102 such as a mobile device, a laptop, etc. The mobile device 102 may include one or more co-existence registers, 140 where the values of such co-existence registers 140 may be provided by a manufacture of the device 102. In one implementation, the values of the co-existence registers 140 may be dynamic in that the user of the device 102 or a co-ex manager 104 may be able to change it. The antenna 120 may communicate using one or more of various wireless access points such as a BLE access point 130, a WiFi access point 132, a Bluetooth access point 134, etc.

The co-ex manager 104 may monitor the activities of one or more wireless endpoints, such as a Bluetooth low energy (BLE) endpoint 114, a 5G endpoint 116, a Bluetooth endpoint 118, etc. Additionally, other wireless endpoints, such as a WiFi endpoint 115, an LTE endpoint 117, etc., may also be provided and configured in a manner similar to the wireless endpoints 114, 116, 118. In one implementation, the co-ex manager 104 includes a power level calculation module 106 to determine transmission power levels of the various endpoints, such as, for example, average or peak power in a pre-determined average window. For example, in one implementation, the power level calculation module 106 determines the average transmission power level of the BLE endpoint 114 over predetermined rolling time period window of, say 10 ms. The Predetermined rolling time period windows may be tied to expected activity level of the device 102 or based on expectation of the co-ex manager 104. In an alternative implementation, the power level calculation module 106 also determines the reception power levels of the various wireless endpoints.

In one implementation, each of the wireless endpoints 114, 116, 118 may have its own set of flags 142 and tables 144 that allows that particular wireless endpoint to determine its mode of operation. The co-ex manager 104 may arbitrate between any conflicts in the request for mode of operation by the multiple wireless endpoints 114, 116, 118.

An activity level monitoring module 108 may monitors activity levels of the various wireless endpoints. For example, the activity level monitoring module 108 monitors peak transmission power levels of the various wireless endpoints. In an alternative implementation, the activity level monitoring module 108 also monitors the peak reception power levels of the various wireless endpoints. A received signal strength indicator (RSSI) determination module 109 determines estimated power levels received by the various wireless endpoints.

A comparator 110 of the co-ex manager compares various values determined by the module 106-109 with the values of one or more of co-ex registers 140. The co-ex registers may include various flags 142 and tables 144 that specify how various wireless endpoints are to coexist together. Examples of one or more such flags, tables, and their descriptions are provided below. While the table I illustrated in FIG. 6 provides an example of a scheme for BLE co-existence with WiFi, in other configurations, tables for co-existence between WiFi and LTE, BLE and LTE, Wifi and LTE sub-6, etc., may be provided. Thus, depending on the number of wireless endpoints and desired co-existence schemes, many other such tables may be provided.

In one implementation, output from the comparator 110 is used to control a switch 112 that controls which of the various wireless endpoints 114-118 uses the antenna 120. In other words, the switch 112 may be used to control the antenna operating mode of the wireless endpoints 114-118.

BLE5GCoExMask can be selected by a manufacturer (referred to herein as the "OEM") to set the wireless endpoints co-existence mode. In the illustrated implementation, the BLE5GCoExMask can be set to values 0x1, 0x2, or 0x4, which are interpreted by the hardware to operate the wireless endpoint in one of FullShare mode, StaticCoEx mode, or HybridMode.

For example, if the OEM does not have any concerns with the emissions from the wireless endpoints and resulting cross-emission and coupling, the OEM may set the BLE5GCoExMask to FullShare. In that case, the wireless endpoints, such as a BLE endpoint and a 5G endpoint, will always share the antenna resource. Thus, if the BLE5GCoExMask was set to FullShare, each of the wireless endpoints may use the antenna resource in a 2×2 mode, or other alternative MIMO configuration. In some implementations, a MIMO configuration may be physically relocated intelligently to different antennas thru switches. In other instances, the MIMO simply reduces from a MAX transmit capacity configuration to lower transmit capacity configurations, such as 4×4 to 2×2, 1×2, etc. Alternatively, if the OEM believes that the emissions by the endpoints may results in cross-emission and coupling between the signals from various wireless endpoints, the BLE5GCoExMask may be set to StaticCoEx mode. In that case, the wireless endpoints will use the antennas in 1×2 mode.

When HybridMode option is set for BLE5GCoExMask, the BLE threshold values provided by the HybridModeTable are used to determine the BLE endpoint activity levels under which the device shall operate the antenna in a 2×2 multiple input/multiple output (MIMO) mode.

In a manner similar to the threshold table, each wireless endpoint may have an independent table for monitoring its total power and specifications for adjustments thereof. The value of the HybridModeMask can be set by the OEM to specify the type of coexistence to be applied between the wireless endpoints. If the HybridModeMask is set to ThresholdTrigger, then triggers based on the BLEThresholdTable may be used to switch operation of the BLE endpoint between 1×2 and 2×2 mode. If the HybridModeMask is selected to be PwrAvgTrigger, the operation of the BLE endpoint may be set to one of 1×2 or 2×2 mode based on determination of one or more of the BLE power criteria listed below:

| BLE Power Criteria | BLE operation if value > | BLE operation if value < |
|---|---|---|
| BLE distance to client device | 2 × 2 | 1 × 2 |
| BLE consecutive NACKs | 2 × 2 | 1 × 2 |
| BLE duty cycle | 2 × 2 | 1 × 2 |
| BLE advertisement cycle | 2 × 2 | 1 × 2 |
| BLE received signal strength indicator (RSSI) estimates | 1 × 2 | 2 × 2 |
| BLE server type | N/A | N/A |
| Wi-Fi measured power based on the shared antenna | 1 × 2 | 2 × 2 |

The above MIMO configurations are for illustration purpose only and there can be any number of allowed maximum MIMO configuration with more columns if needed. Furthermore, depending on the co-existence needs, other wireless technologies than Wi-Fi can be also listed in the table above. For example, a user may select values for each of the above listed BLE power criteria to trigger the change in operation of the BLE endpoint between 1×2 and 2×2 mode. As an example, if the user has set the BLE RSSI to x, if the measured value of the BLE RSSI estimate is above x, the BLE endpoint is operated in the 1×2 mode, and if the measured value of the BLE RSSI estimate is below x, the BLE endpoint is operated in the 2×2 mode. Furthermore, the co-existence manager 104 may monitor the total allowed transmit average power, either static or dynamic, that it allocated for one or more of the wireless endpoints. For example, a BLE client can keep its total transmission to each device below a certain transmit average power in a critical period. In one implementation, the co-existence manager 104 monitors such total allowed transmit average power for each of the wireless endpoints.

If the HybridModeMask is set to ComboTrigger, the operation of the BLE endpoint is switched based on the BLEThresholdTable and based on the values of one or more BLE power criteria disclosed above.

In the HybridModeTable, each BLE Power Level is associated with its own threshold value. The threshold value is calculated based on window average and represents total percentage of transmit ON time. In one implementation, the threshold values range between 0-100. For example, a value of 100 has the same effect as the BLE5GCoExMask being set to FullShare. On the other hand, a value of 0 has the same effect as the BLE5GCoExMask being set to StaticCoEx.

As disclosed above, when the value of the BLE5GCoExMask flag is set to FullShare (0x1), the BLE endpoint 114 and the 5G endpoint 116 simultaneously use the antenna resource. When the BLE5GCoExMask flag is set to StaticCoEx (0x2), the 5G endpoint 116 operates the antenna resource in 1×2 mode. When the HybridModeMask flag value is set to ThresholdTrigger (0x4).

Figure 2:
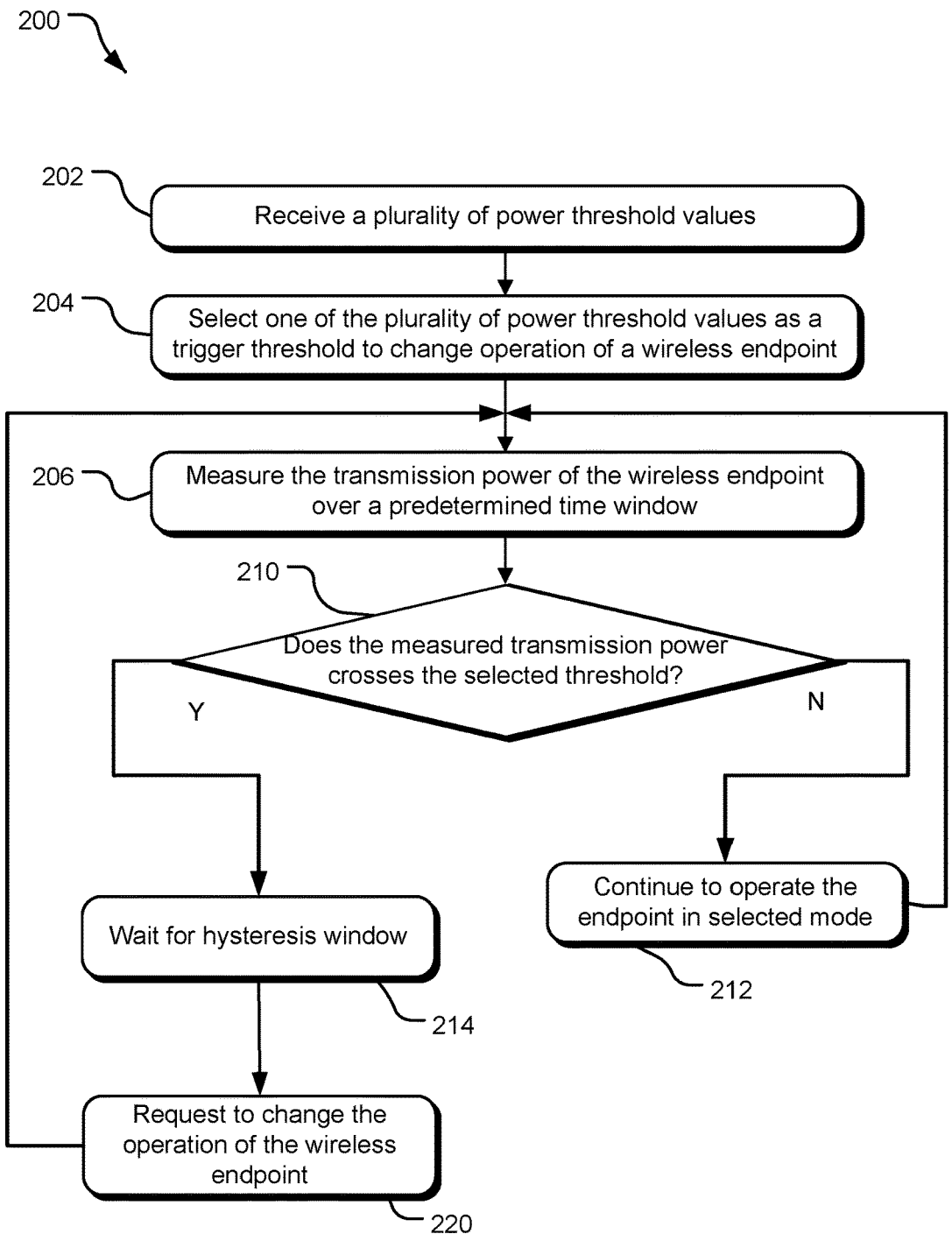
FIG. 2 illustrates example operations for sharing an antenna across multiple endpoints according to implementations disclosed herein.

FIG. 2 illustrates example operations 200 for sharing an antenna across multiple endpoints based on threshold based wireless endpoint control. An operation 202 receives a plurality of threshold level values. The options of threshold level values may be based on a linear step-wise function in that as the threshold values range from 0 to 100, each threshold level represents a ten (10) percent increase in power level. Alternatively, the threshold values may be based on a non-linear step-wise function.

At operation 204 the user may select one of the threshold values as a trigger threshold to switch operation of the wireless endpoint. For example, the user may select that pwr_lvl_5 as a threshold trigger such that if the wireless endpoint activity is above pwr_lvl_5, it determines that a switch from operating the wireless endpoint from 2×2 mode to 1×2 mode is necessary. If the user selects the threshold level to be zero (0), this forces the wireless endpoint to always use the antenna in a 1×2 transmission mode or in other specified MIMO configuration, as the measured power over a predetermined window is always greater than the threshold value of zero (0). On the other hand, if the user selects that threshold be 100, this will force the wireless endpoint to be operated the antenna in a 2×2 transmission mode, as the measured power over the predetermined window is always less than the threshold of 100.

An operation 206 measures the average transmitted or received power level for an endpoint over a predetermined window. The power over the predetermined window may be measured based on amount of activity over time which may be determined based on power level per the advertised channel, power level for the connection cycle, and window of transmission and/or reception for the wireless endpoint. The predetermined window may be set using the value N of BLEAvgWnd. For example, the value of N can be set between 0x0000 and 0xFFFF or any other suitable value based on the technology of the wireless endpoint, giving the window length to be equal to 625 μsec×N. For example, the predetermined window time may be determined based on an expected activity level of the device, such as the device 102. The expected activity level may be changed based on calculation of past activity level of the device. Alternatively, a co-ex manager such as the co-ex manager 104 may decide the predetermined window time. For example, the co-ex manager 104 may determine that it is interested in using a 5G endpoint for next ten cycles and based on such determination it decides the predetermined window time period.

In one implementation, the value of N may be set by the OEM or revised by the user. In an alternative implementation, the value N of the BLEAvgWnd is multiplied by an alternative time such as the smallest transmit connection cycle for the device using the wireless endpoints. In such an implementation, the selection of the time transmit connection cycle that is multiplied into N to determine the predetermine time window for power measurement is determined dynamically based on connection of wireless devices such as mouse, keyboard, speaker, etc., to a host computing device.

If the value N for the BLEAvgWnd is large, this results in less switching of the wireless endpoint operation mode between 1×2 and 2×2 mode. In this case, the system is less responsive to spikes in transmission or reception power over a wireless endpoint. On the other hand, if the value N for the BLEAvgWnd is small, this results in more switching of the wireless endpoint operation mode between 1×2 and 2×2 mode. In this case, the system is more responsive to spikes in transmission or reception power over a wireless endpoint.

An operation 210 determines whether the measured transmission (or reception) power has crossed the selected threshold trigger. If so, the wireless endpoint waits for a hysteresis window of time before generating a request for change in its operation mode. The hysteresis window may be calculated as $[(M*7.5 \text{ ms})+\alpha]$, where the values of the parameters M and a can be set by the user. Here the multiplier 7.5 is for illustration purposes only and it can be set to different values based on the technology used or as determined dynamically by the co-existence engine. In one implementation, M is an integer value between 0 and 1024 and the value a is a pseudo-random value between 0-30 ms. At operation 220, the wireless endpoint sends a request to the co-ex manager to switch the operation of the wireless endpoint to a different mode based on the change in the measured power level as compared to the selected threshold trigger.

Figure 3:
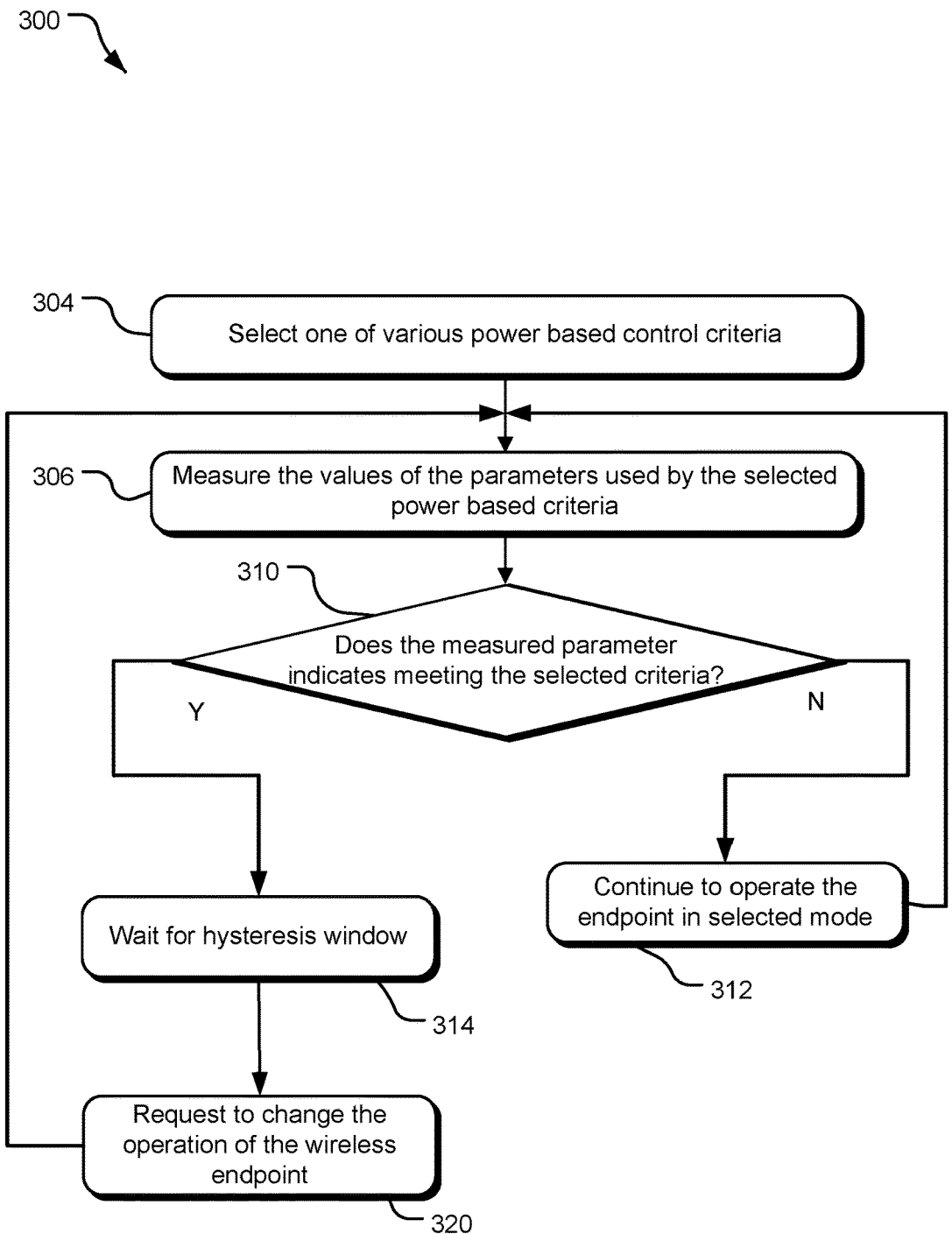
FIG. 3 illustrates alternative example operations for sharing an antenna across multiple endpoints according to implementations disclosed herein.

FIG. 3 illustrates example operations 300 for sharing an antenna across multiple endpoints based on various power based wireless endpoint control criteria. An example of such power based control criteria may be a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on RSSI estimates of the wireless endpoint, a criterion based on the type of server of the wireless endpoint, and a criterion based on the measured power of other wireless endpoints using the antenna resource used by the given wireless endpoint. An operation 304 selects one of these power based criteria.

An operation 306 measures values of the parameters used by the selected one of the various power based criteria. For example, the measured parameters may include the wireless endpoint distance from a client, the number of consecutive NACKs for the wireless endpoint, the duty cycle of the wireless endpoint, the advertisement cycle of the wireless endpoint, the RSSI estimates of the wireless endpoint, the type of server of the wireless endpoint, and the measured power of other wireless endpoints using the antenna resource used by the given wireless endpoint.

An operation 310 determines if the measured parameter indicates meeting the selected criteria. If, so, an operation 310 waits for a hysteresis window to pass and subsequently an operation 320 sends a request to change the operation of the wireless endpoint to the co-ex manager managing the wireless endpoints of the device.

Figure 4:
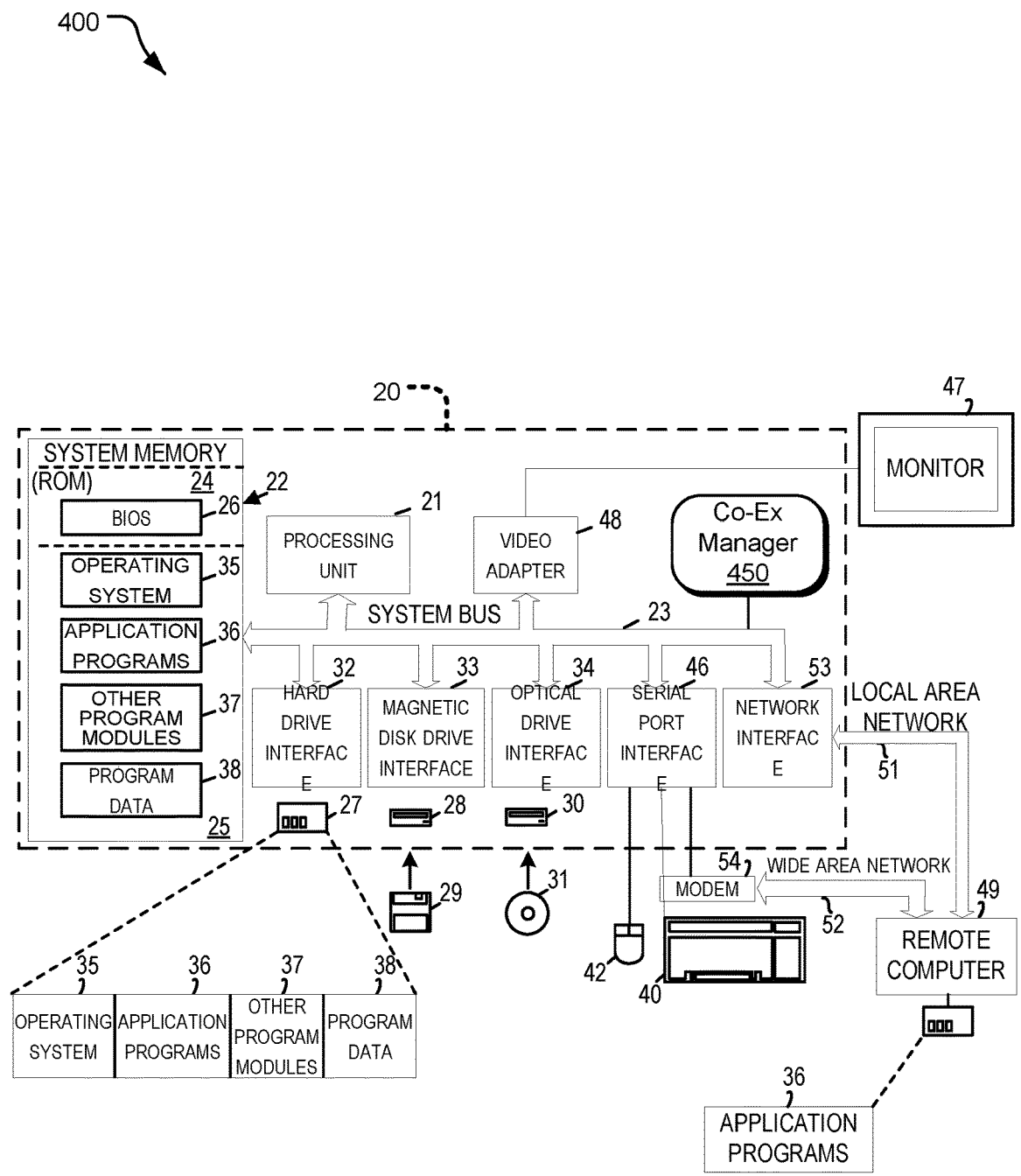
FIG. 4 illustrates an example system that may be useful in implementing the described technology.

The example hardware and operating environment of FIG. 4 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 4, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 400, the computer 20 also includes a Co-Ex manager 450 providing one or more functions of the antenna sharing operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a co-ex module as illustrated in FIGS. 1-5. In one implementation, one or more instructions to share an antenna across multiple endpoints may be stored in memory of the computer 20, such as the read-only memory (ROM) 24 and random access memory (RAM) 25, etc.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for requesting and managing antenna resource may be stored in system memory 22 and/or storage devices 29 or 31 and processed by the processing unit 21. A Co-Ex module 450 communicatively connected with the processing unit 21 and the memory 22 may enable one or more of the capabilities of the antenna sharing system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 5:
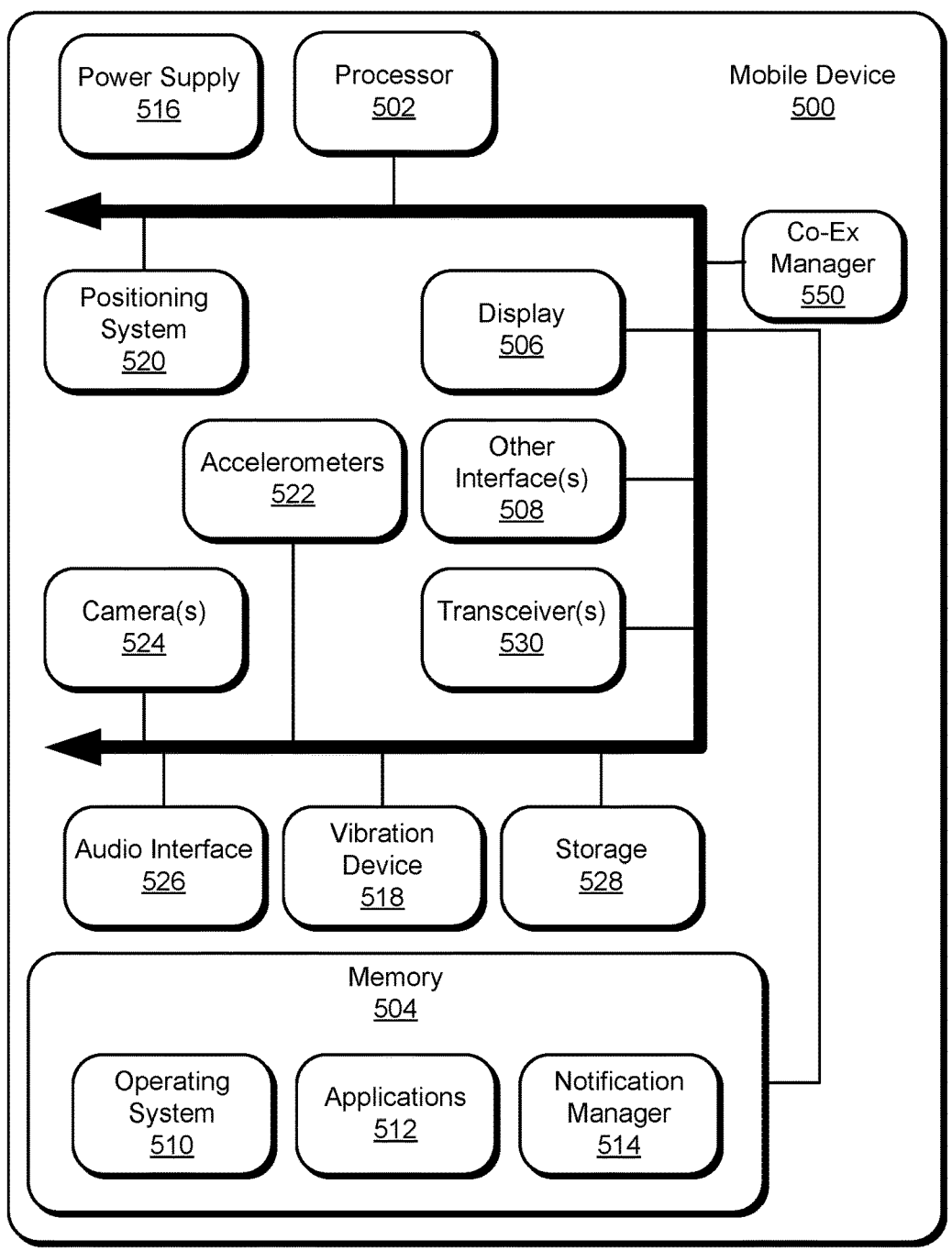
FIG. 5 illustrates an example mobile device that may be useful in implementing the described technology.

FIG. 5 illustrates another example system (labeled as a mobile device 500) that may be useful in implementing the described technology. The mobile device 500 includes a processor 502, a memory 504, a display 506 (e.g., a touchscreen display), and other interfaces 508 (e.g., a keyboard). The memory 504 generally includes both volatile memory (e.g., RAM) and non-volatile memory (e.g., flash memory). An operating system 510, such as the Microsoft Windows® Phone operating system, resides in the memory 504 and is executed by the processor 502, although it should be understood that other operating systems may be employed.

One or more application programs 512 are loaded in the memory 504 and executed on the operating system 510 by the processor 502. Examples of applications 512 include without limitation email programs, scheduling programs, personal information managers, Internet browsing programs, multimedia player applications, etc. A notification manager 514 is also loaded in the memory 504 and is executed by the processor 502 to present notifications to the user. For example, when a promotion is triggered and presented to the shopper, the notification manager 514 can cause the mobile device 500 to beep or vibrate (via the vibration device 518) and display the promotion on the display 506.

The mobile device 500 includes a power supply 516, which is powered by one or more batteries or other power sources and which provides power to other components of the mobile device 500. The power supply 516 may also be connected to an external power source that overrides or recharges the built-in batteries or other power sources.

The mobile device 500 includes one or more communication transceivers 530 to provide network connectivity (e.g., mobile phone network, Wifi®, BlueTooth®, etc.). The mobile device 500 also includes various other components, such as a positioning system 520 (e.g., a global positioning satellite transceiver), one or more accelerometers 522, one or more cameras 524, an audio interface 526 (e.g., a microphone, an audio amplifier and speaker and/or audio jack), and additional storage 528. Other configurations may also be employed.

In an example implementation, a mobile operating system, various applications, and other modules and services may be embodied by instructions stored in memory 504 and/or storage devices 528 and processed by the processing unit 502. User preferences, service options, and other data may be stored in memory 504 and/or storage devices 528 as persistent datastores. A Co-Ex manager 550 communicatively connected with the processor 502 and the memory 504 may enable one or more of the capabilities of the antenna sharing system disclosed herein.

The antenna sharing system disclosed herein provides a solution to a technological problem necessitated by the requirement for sharing an antenna resource across multiple endpoints. Specifically, the antenna sharing system disclosed herein provides an unconventional technical solution to this technological problem by communicating with multiple endpoints to request an antenna resource.

A method disclosed herein includes measuring (108) an activity level of a wireless endpoint (114-118) over a predetermined time period, comparing (110) the measured activity level of the wireless endpoint of the wireless endpoint with a threshold activity level, and in response to the comparison, changing an antenna (120) operating mode of the wireless endpoint. In one implementation, the wireless endpoint is a Bluetooth low energy (BLE) endpoint and the activity level is a level of transmission of signals from the BLE endpoint. In an alternative implementation, the method further includes waiting for at least a hysteresis period before changing the antenna operating mode of the wireless endpoint in response to the comparison. In another implementation, the method further includes generating a request to a co-ex manager to change the antenna operating mode of the wireless endpoint in response to the comparison.

Alternatively, the method further includes measuring a value of a parameter used by one of a plurality of power based criteria, determining if the measured value of a parameter indicates meeting of the one of the plurality of power based criteria, and based on the determination, changing the antenna operating mode of the wireless endpoint. In one implementation, the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on received signal strength indicator (RSSI) estimates of the wireless endpoint, a criterion based on the type of server of the wireless endpoint, and a criterion based on the measured power of other wireless endpoints using the antenna resource used by the given wireless endpoint. Alternatively, the antenna operating mode of the wireless endpoint is one of 1×2 multiple input/multiple output (MIMO) transmission mode and 2×2 MIMO transmission mode.

A physical article of manufacture including one or more tangible computer-readable storage media, encoding computer-executable instructions for executing on a computer system a computer process, the computer process including measuring an activity level of a wireless endpoint over a predetermined time period, comparing the measured activity level of the wireless endpoint of the wireless endpoint with a threshold activity level, and in response to the comparison, changing an antenna operating mode of the wireless endpoint. In one implementation, measuring an activity level of a wireless endpoint further comprising measuring transmission of signals of a Bluetooth low energy endpoint.

Alternatively, the computer process further includes, in response to the comparison, waiting for at least a hysteresis period before changing the antenna operating mode of the wireless endpoint. Yet alternatively, the computer process further comprising, in response to the comparison, generating a request to a co-ex manager to change the antenna operating mode of the wireless endpoint. In one implementation, the computer process further includes changing the antenna operating mode of the wireless endpoint in response to determining that a measured value of a parameter used by one of a plurality of power based criteria indicates meeting of the one of the plurality of power based criteria.

In an alternative implementation, the computer process further includes measuring the value of a parameter used by the plurality of one of a plurality of power based criteria. Yet alternatively, the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on RSSI estimates of the wireless endpoint, a criterion based on the type of server of the wireless endpoint, and a criterion based on the measured power of other wireless endpoints using the antenna resource used by the given wireless endpoint. Alternatively, the antenna operating mode of the wireless endpoint is one of 1×2 multiple input/multiple output (MIMO) transmission mode and 2×2 MIMO transmission mode.

A device disclosed herein includes an antenna (120), an activity level monitor (108) to measure an activity level of a wireless endpoint (114-118) over a predetermined time period, a comparator (110) to compare the measured activity level of the wireless endpoint of the wireless endpoint with a threshold activity level, and a switch (112) configured to change an antenna operating mode of the wireless endpoint in response to the output of the comparator. In one implementation, the wireless endpoint is a Bluetooth low energy (BLE) endpoint and the activity level is a level of transmission of signals from the BLE endpoint. Alternatively, the switch is further configured to wait for at least a hysteresis period before changing the antenna operating mode of the wireless endpoint.

Yet alternatively, the device further includes an RSSI determination module configured to determine estimated power level received by the wireless endpoint and wherein the switch is further configured to change an antenna operating mode of the wireless endpoint in response to comparison of the estimated power level received by the wireless endpoint with respect to a threshold power level. In one implementation, the comparator is further configured to compare a measured value of a parameter used by one of a plurality of power based criteria with a threshold value provided by the one of the plurality of power based criteria, wherein the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on received signal strength indicator (RSSI) estimates of the wireless endpoint, a criterion based on the type of server of the wireless endpoint, and a criterion based on the measured power of other wireless endpoints using the antenna resource used by the given wireless endpoint.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
   measuring an activity level of a wireless endpoint over a predetermined time period;
   comparing the measured activity level of the wireless endpoint with a threshold activity level; and
   in response to the comparison, changing an antenna operating mode of the wireless endpoint after waiting for at least a hysteresis period, wherein the hysteresis period is determined based on an integer value selected by a user and a pseudo-random value.

2. The method of claim 1, wherein the wireless endpoint is a Bluetooth low energy (BLE) endpoint and the activity level is a level of transmission of signals from the BLE endpoint.

3. The method of claim 1, further comprising:
   in response to the comparison, generating a request to a co-ex manager to change the antenna operating mode of the wireless endpoint.

4. The method of claim 1, further comprising:
   measuring a value of a parameter used by one of a plurality of power based criteria;
   determining if the measured value of a parameter indicates meeting of the one of the plurality of power based criteria; and
   based on the determination, changing the antenna operating mode of the wireless endpoint.

5. The method of claim 4, wherein the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on received signal strength indicator (RSSI) estimates of the wireless endpoint, a criterion based on the type of server of the wireless endpoint, and a criterion based on the measured power of other wireless endpoints using the antenna resource used by the given wireless endpoint.

6. The method of claim 1, wherein the antenna operating mode of the wireless endpoint is one of 1×2 multiple input/multiple output (MIMO) transmission mode and 2×2 MIMO transmission mode.

7. The method of claim 1, wherein the integer value is between 0-1024 and the pseudo-random value is between 0-30 ms.

8. The method of claim 1, further comprising determining the predetermined time period for measuring the activity level based on a value of a BLEAvgWnd flag.

9. The method of claim 1, further comprising selecting the threshold activity level from one of a plurality of threshold activity levels based on a BLE power level.

10. A physical article of manufacture including one or more tangible computer-readable storage media, encoding computer-executable instructions for executing on a computer system a computer process, the computer process comprising:
    measuring an activity level of a wireless endpoint over a predetermined time period;
    comparing the measured activity level of the wireless endpoint with a threshold activity level; and
    in response to the comparison, changing an antenna operating mode of the wireless endpoint after waiting for at least a hysteresis period, wherein the hysteresis period is determined based on an integer value selected by a user and a pseudo-random value.

11. The physical article of manufacture of claim 10, wherein measuring an activity level of a wireless endpoint further comprising measuring transmission of signals of a Bluetooth low energy endpoint.

12. The physical article of manufacture of claim 10, wherein the computer process further comprising, in response to the comparison, generating a request to a co-ex manager to change the antenna operating mode of the wireless endpoint.

13. The physical article of manufacture of claim 10, wherein the computer process further comprising, changing the antenna operating mode of the wireless endpoint in response to determining that a measured value of a parameter used by one of a plurality of power based criteria satisfies the one of the plurality of power based criteria.

14. The physical article of manufacture of claim 13, wherein the computer process further comprising measuring the value of a parameter used by the plurality of one of a plurality of power based criteria.

15. The physical article of manufacture of claim 13, wherein the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on RSSI estimates of the wireless endpoint, a criterion based on the type of server of the wireless endpoint, and a criterion based on the measured power of other wireless endpoints using the antenna resource used by the given wireless endpoint.

16. The physical article of manufacture of claim 10, wherein the antenna operating mode of the wireless endpoint is one of 1×2 multiple input/multiple output (MIMO) transmission mode and 2×2 MIMO transmission mode.

17. A device, comprising:
    an antenna;
    an activity level monitor to measure an activity level of a wireless endpoint over a predetermined time period;
    a comparator to compare the measured activity level of the wireless endpoint of the wireless endpoint with a threshold activity level; and
    a switch configured to change an antenna operating mode of the wireless endpoint in response to the output of the comparator after waiting for at least a hysteresis period, wherein the hysteresis period is determined based on an integer value selected by a user and a pseudo-random value.

18. The device of claim 17, wherein the wireless endpoint is a Bluetooth low energy (BLE) endpoint and the activity level is a level of transmission of signals from the BLE endpoint.

19. The device of claim 17, further comprising an RSSI determination module configured to determine estimated power level received by the wireless endpoint and wherein the switch is further configured to change an antenna operating mode of the wireless endpoint in response to comparison of the estimated power level received by the wireless endpoint with respect to a threshold power level.

20. The device of claim 19, wherein the comparator is further configured to compare a measured value of a parameter used by one of a plurality of power based criteria with a threshold value provided by the one of the plurality of power based criteria, wherein the plurality of power based criteria includes at least one of a criterion based on the wireless endpoint distance from a client, a criterion based on number of consecutive NACKs for the wireless endpoint, a criterion based on the duty cycle of the wireless endpoint, a criterion based on the advertisement cycle of the wireless endpoint, a criterion based on received signal strength indicator (RSSI) estimates of the wireless endpoint, a criterion based on the type of server of the wireless endpoint, and a criterion based on the measured power of other wireless endpoints using the antenna resource used by the given wireless endpoint.

* * * * *